Nov. 6, 1956   E. SICK   2,769,374
ELECTRICAL LIGHT SCREEN
Filed Oct. 18, 1952   2 Sheets-Sheet 1
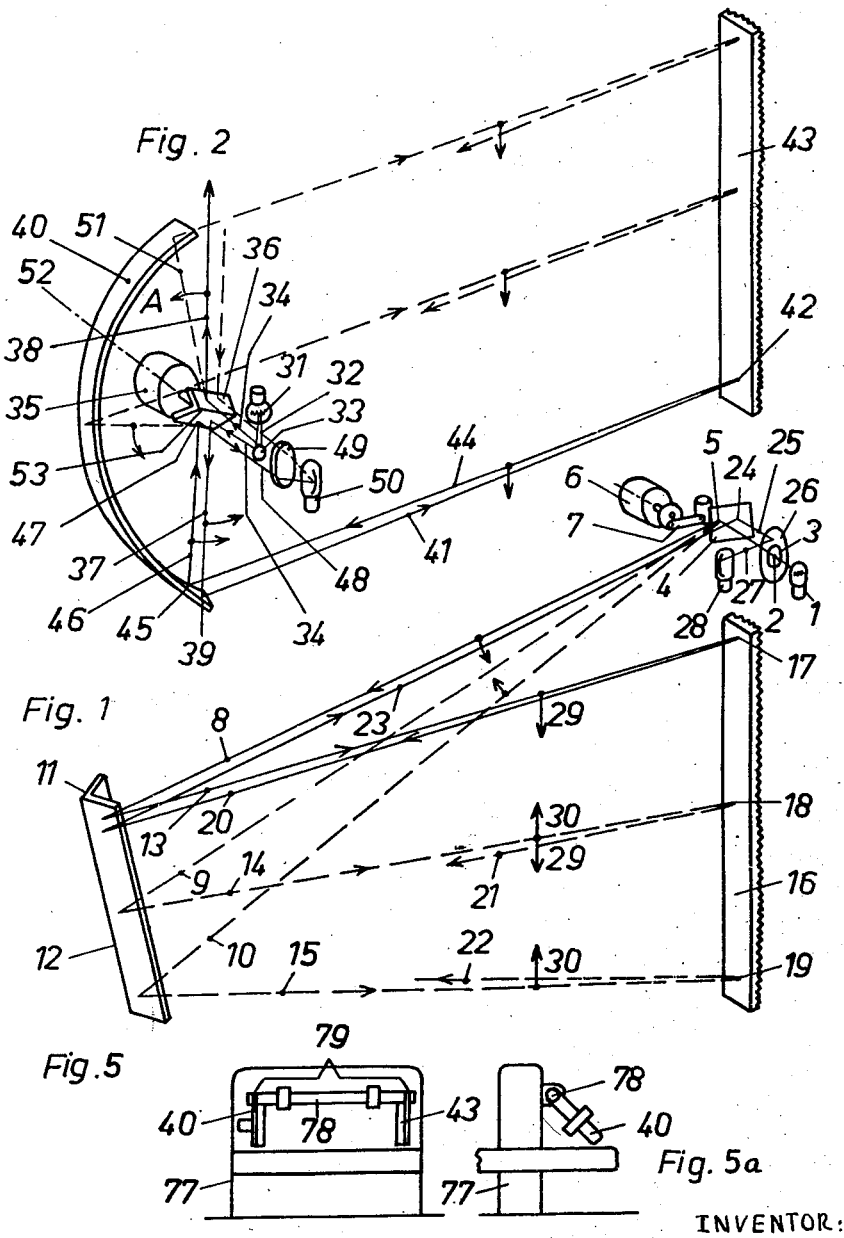
INVENTOR:
Erwin Sick
BY
Richards & Geier
ATTORNEYS Nov. 6, 1956  E. SICK  2,769,374
ELECTRICAL LIGHT SCREEN
Filed Oct. 18, 1952  2 Sheets—Sheet 2

INVENTOR:
Erwin Sick
BY
Richards & Geier
ATTORNEYS

United States Patent Office 2,769,374
Patented Nov. 6, 1956

2,769,374

ELECTRICAL LIGHT SCREEN

Erwin Sick, Vaterstetten, near Munich, Germany

Application October 18, 1952, Serial No. 315,460

Claims priority, application Germany October 19, 1951

3 Claims. (Cl. 88—74)

This invention relates to an electrical light screen for use as a burglar alarm or as a safety device in conjunction with moving stairs or the like, or as a switch-off device for the prevention of accidents for use in machine tools, presses, stamping machines, cutting machines, rolling mills and many others.

The invention is particularly concerned with an electrical light screen carrying upon its sender side a photoelectric cell or a similar device which is adapted to actuate the safety operations, thereby avoiding the use of electrical conduits which are often difficult and inconvenient to mount.

Electrical light screens known in prior art have the drawback that it is practically impossible to adjust the precise positions of the light sender, the reflector and the photo-electric receiver, particularly when the screen is used in conjunction with a large vibrating machine, although such precise adjustment is necessary to provide a screen which operates properly. Even small shiftings of the above-mentioned screen parts make it unuseable. Even in cases wherein a single bundle of light is used, such as the screens serving as a safety device in moving staircases, said light bundle being projected by a sender and being reflected upon a photo-electric receiver, the required precise location of the mirror used in prior art as the reflector can be maintained only for a comparatively short time period.

An object of the present invention is to eliminate the above mentioned drawbacks and to provide an electrical light screen which is comparatively simple in construction and effective in operation and which can be used for lengthy time periods without the necessity of a precise adjustment of its parts.

Other objects of the present invention will become apparent in the course of the following specification.

In accomplishing the objects of the present invention, it was found advisable to use as a reflector a light returning element, for example, at least one so-called tripel, also known as tripoli mirror or pyramidal auto-collimating reflector, dome-shaped lens, acorn-shaped lens or plate lens. This device reflects light cast upon it within a predetermined angle parallel to its initial direction. Through the use of this device, it is possible to produce electrical light screens of the above-mentioned type, so that they will be sufficiently receptive to adjustment and yet sturdy in construction; the reflector can be shifted by vibrations or the like up to plus or minus 15° from its correct position without rendering unuseable the screen provided therewith. Despite substantial shiftings of this nature, a sufficient amount of light will reach the light sensitive receiver.

In accordance with the present invention it is possible to use a single reflector of a large size, or it is possible to provide a strip-like compound composed of a plurality of small reflectors which preferably can have the form of a mirror compound.

It is particularly advantageous to use a reflector compound composed of a plurality of smaller elements in conjunction with screens having a comparatively large area. Heretofore, devices of this type were quite unsatisfactory, since it was necessary to use a light bundle of zig-zag shape reflected between two mirrors which finally was transmitted to a photo-electric cell. In view of this complicated path of light the sensitivity of the prior art apparatus was exceptionally great. By way of example, in order to provide an electrical light screen of about 30 cm. height it was necessary in prior art devices to reflect the light six times. In this case the deviation of the light ray is equal to $2^6 \times b$, wherein $b$ is the angle to which a mirror is shifted. It is apparent that such an apparatus is extremely sensitive. Furthermore, in prior art devices of this type, due to the large number of reflections and to the large zigzag path between the reflecting elements, the intensity of the light reaching the photo-electric cell is reduced to a small fraction of its original value. These drawbacks of prior art devices are eliminated by the present invention.

The invention will appear more clearly from the following detailed description when taken in connection with the accompanying drawings, showing by way of example preferred embodiments of the inventive idea.

In the drawings:

Figure 1 is a diagram illustrating an electrical light screen constructed in accordance with the principles of the present invention and comprising a quickly movable bundle of rays forming a light curtain.

Figure 2 is a diagram illustrating a differently constructed light screen.

Figure 5 is a front view of a machine tool provided with a safety device consisting of a light screen.

Figure 5a is a side view of the machine shown in Figure 5.

Figure 3:
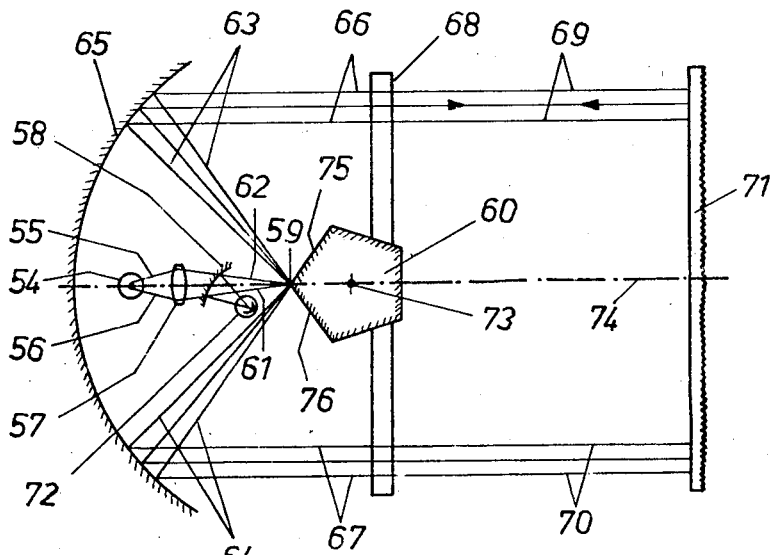
Figure 3 is a side view of a different modification of the screen.

In the drawings the bundles of light have been indicated by single lines for the sake of simplicity.

The electrical light screen shown in Figure 1 comprises a source of light 1 which projects a bundle of rays 2 upon an objective 3. The objective 3 unites the bundle of rays at the location 5 upon a swinging mirror 4. The mirror 4 is connected with an electrical motor 6 by means of an eccentric device 7, so that the motor 6 causes the mirror 4 to carry out periodical oscillations. Due to this arrangement the rays reaching the mirror 4 are reflected consecutively in the directions 8, 9 and 10 and in all the intermediate directions, so that the light traverses the path limited by the directions 8 and 10 in Figure 1. The light strikes a mirror 11 which is of angular roof-like shape and is reflected in the various directions 13, 14 and 15, as well as the intermediate directions. The roof-like mirror 11 limits the electrical light screen on one side. A strip-like compound 16 which may consist of tripel mirrors limits the electrical light screen on the other side. The member 16 receives the light reflected by the member 12 at 17, 18 and 19 and all the intermediate locations, so that this strip is continuously traversed by light. Since light reaching the locations 17 to 19 will always find reflectors therein, this light will be reflected by the member 16 back to the mirror 11. It is apparent that this reflection will take place within a change in location of plus or minus 15°. The light rays will be reflected along the directions 20, 21 and 22 and intermediate directions. It is thus apparent that the locations of the parts can be shifted to a comparatively substantial extent without bringing the screen out of commission.

The light rays 20, 21 and 22 strike the mirror 11 from a direction opposite to that of the light rays 13, 14 and 15 and are reflected by the mirror 11 back upon the swinging mirror 4.

For the sake of simplicity, Figure 1 shows only one reflected light bundle 23.

All the bundles of light corresponding to the bundle 23 strike the swinging mirror 4 at the location 24 and are thence reflected in the same direction 25. An annular mirror 26 is preferably used to reflect the light rays 25 in the direction 27, so that they will reach the receiver 28, which may be a photo-electric cell, a photo-electrical resistance or the like. The receiver 28 is used to actuate a device not shown in the drawings which may switch off a machine and/or switch on an emergency signal or the like.

It is apparent that the light bundle which swings back and forth in the directions 29 and 30 forms an uninterrupted light curtain provided that it swings sufficiently fast. The curtain will be interrupted only when, for example, the arm of a worker is moved into it, since then instead of the normal continuous light a pulsating light appears, the oscillations of which have the same rhythm as the oscillations of the light bundle, and are interrupted by dark places. As already stated, these intermediate periods of darkness can be used to switch off a machine or issue some warning. This can be effected by means of a receiver (not shown) having a switch provided with a retarding device which is affected only by continuous light but not by pulsating light, the retardation beginning again at the beginning of each light impulse and being greater than the duration of the light impulse.

The device shown in Figure 2 includes the source of light 31 which emits a bundle of rays 32 which strikes a mirror 33. The mirror 33 reflects the light in the direction 34, so that it strikes an angular mirror 36 which is connected with a motor 35 and is rotated thereby. The bundle of rays 34 strikes the angular mirror 36 in such manner that it is divided into two ray bundles 37 and 38. In the position shown in Figure 2 the partial ray bundle 37 is reflected upon the location 39 of a hollow mirror 40. The hollow mirror 40 limits the screen on one side. The light rays 39 are reflected by the mirror 40 in the direction 41 and strike the mirror compound 43 at the location 42. The mirror compound 43 is composed of a plurality of reflectors and limits the screen on the other side. The light rays 41 are reflected from the location 42 of the member 43 back in the direction 44 and strike at 45 the hollow mirror 40. Thence, the light rays are reflected in the direction 46 upon the angular mirror 36. The light rays strike the mirror 36 at 47 and are reflected in the direction 48. Due to a small diffusion of the rays 48 a part of this light passes the mirror 33 and reaches the objective 49 which unites the light upon a photo-electric cell 50 or the like. The light receiver 50 is used to switch off a machine and/or to switch on a warning signal or the like.

The partial light bundle 38 in the illustrated position of the mirror 36 will not strike the hollow mirror 40 but will go past this mirror. However, the light bundle 38 turns counter-clockwise in the direction A so that soon after the illustrated position it will assume the direction 51 in which it is subject to the same reflections as the partial light bundle 37.

In order to provide continuous illumination of the cell 50 which is interrupted only when the light curtain is interrupted, it is necessary that the partial light bundle reflected by a surface of the angular mirror 36 be separated without interruption from the partial light bundle which is reflected by the second surface of the angular mirror 36 during the rotation of the mirror. Thus, it is necessary that the rotating angular mirror 36 should throw upon the hollow mirror 40 an amount of light which should be as constant as possible, irrespective as to whether the light depending upon the rotary position of the angular mirror reaches the hollow mirror only from one partial light bundle or from both partial light bundles as is the case in the end positions determined by the size of the hollow mirror 40. Then, at least approximately the same amount of light is thrown by the hollow mirror upon the mirror compound 43, so that the member 43 reflects not only any amount of light but actually reflects at least approximately the same amount of light upon the hollow mirror 40 and, consequently, upon the cell 50.

In accordance with the construction shown in Figure 2, this is attained in a particularly simple manner by providing an angular mirror 36 in the form of a so-called roof-like body and by forming the hollow mirror 40 in the form of a parabolic cylindrical mirror, the roof-like mirror 36 being rotated about an axis 52 which extends at right angles to the central edge 53 of the roof-like mirror, which also extends in the middle plane of the side surfaces of the roof-like mirror and which coincides with the focal line of the parabolic mirror 40.

Figure 4:
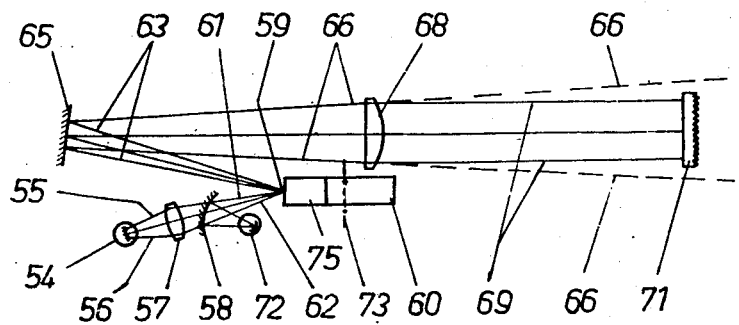
Figure 4 is a top view of the device shown in Figure 3.

In accordance with the device shown in Figures 3 and 4, an electrical light screen having a comparatively large area may be effectively produced by using as an edge mirror a polygonal mirror prism or a so-called mirror wheel, the axis of rotation of which extending at least approximately parallel to the focal line of a preferably parabolic cylindrical mirror and being located from said focal line at a distance which enables the edges of the mirror prism to coincide at least approximately with the focal line during the rotation.

In accordance with a further embodiment of the inventive idea this construction can employ a cylindrical lens, the main axis of which extends in the plane of the light curtain and is perpendicular to the focal line of the cylindrical mirror, so that the cylindrical mirror and the cylindrical lens form an anamorphotic system. It is also possible to arrange a partly transparent hollow mirror between the source of light and the mirror prism, namely, preferably between the mirror prism and an objective which concentrates the light from the light source upon the edges of the mirror prism. Such a hollow mirror will transmit a part of the light arriving from the light source and will reflect a part of the light which was reflected from the mirror prism in such manner that the light is united upon a photo-electric cell or the like, which causes the switch-off of a machine or the switch-on of a signal or the like.

The light bundle 55, 56, emanating from the source of light 54 (Figs. 3 and 4), strikes the objective 57 and passes to about 50% through the mirror 58 which is partly transparent, whereupon the light rays are united upon the edge 59 of the mirror wheel 60 which may be provided with five edges more or less. In the position shown in the drawings, the mirror wheel 60 separates the light bundle 61, 62, which was transmitted through the hollow mirror 58, into two equal light bundles 63 and 64. These light bundles strike the cylindrical parabolic mirror 65 and are thrown from there in the form of light bundles 66, 67 upon the cylindrical lens 68 which along with the hollow mirror 65 forms an anamorphotic system. The cylinder lens 68 unites the light bundle 66, 67 into light bundles 69, 70, which are thrown upon a strip-like mirror complex 71 composed of a plurality of reflectors. Then the light is reflected back upon the cylinder lens 68 and strikes the hollow mirror 65, and is again united upon the edge 59 of the mirror prism 60 and is reflected back upon the partially transparent hollow mirror 58. A part of the light returning to the partially transparent hollow mirror 58 (about 50%) is reflected by the mirror 58 due to its corresponding inclination to the photo-electrical cell, or the like, 72 and is concentrated upon that cell. The cell 72 causes the switching off of a machine or the actuation of a signal.

Figure 3 shows a position of the mirror wheel 60 rotatable about the axle 73 counter-clockwise, in which the prism edge 59 coincides with the focal line of the parabolic mirror 65. The rays 63, 64, as well as the rays 66, 67, and 69, 70, extend, therefore, symmetrically to the main optical axis 74 of the entire system. In this position the mirror surface 75 of the wheel 60 throws as much light upon the parabolic mirror 65 as is projected by the mirror surface 76. If now the mirror wheel 60 continues its rotation counter-clockwise from the illustrated position, then more light will be reflected upon the parabolic mirror from its surface 75 than from its surface 76. If now the rotation continues to the extent of the same angle, then the mirror edge 59 will be turned entirely out of the focal line of the parabolic mirror and then only the mirror surface 75 will cause the reflection.

A geometrical calculation will show that the sum of the light reflected by two adjacent surfaces of the mirror wheel 60 is substantially constant in all positions, so that from a practical point of view the photo-electric cell 72 receives continuously light of substantially constant intensity so long as an object which is impermeable to light, such as the hand of an operator, does not pass through the light curtain to produce black-out impulses.

Figures 5 and 5a show the application of the described electrical light screens as a protecting device of a machine tool. In that case to facilitate the exchanging of the tool, it is advantageous to mount the screen in such manner that it can be pivoted away from the machine 77. Preferably, the screen can be suspended upon a tube 78.

In many cases it is advantageous to vary the distance 79 between the hollow mirror 40 or 65 and the composite mirror compound 43 or 71. Then, these parts may be made movable upon the connecting tube 78, so that the screen can be adjusted to the size of the machine.

The screen can be conveniently connected with a machine tool by any suitable suspension means with the insertion of an intermediate supporting element which may be of rubber or other elastic material.

It is apparent that the described screens can be conveniently adapted for a variety of purposes and that the swinging or rotating light bundle can be conveniently replaced by outer short waves, while the optical reflectors may be replaced by reflectors of outer short waves.

Other variations and modifications may be also made within the scope of the present invention. All such variations and modifications are to be included within the scope of the present invention.

What is claimed is:

1. An electrical light screen, comprising a sender emitting a bundle of light rays, a rotary polygonal mirror prism receiving said ray bundle, a parabolic cylindrical mirror limiting said screen on one side, said rotary polygonal mirror prism being rotated about an axis which is substantially parallel to the focal line of the parabolic mirror and is located at such distance therefrom that the edges of the mirror prism in the course of its rotation at least substantially coincide with said focal line, said mirror prism transmitting light to said parabolic mirror, a mirror limiting said screen on the other side and receiving light from said parabolic mirror, the last-mentioned mirror reflecting said light back to the parabolic mirror and the parabolic mirror reflecting the last-mentioned light back to the mirror prism, and a light receiving releasing device, said device receiving light reflected from said parabolic mirror upon said mirror prism.

2. An electric light screen in accordance with claim 1, comprising a partially transparent hollow mirror located between said sender and said mirror prism and transmitting a part of the light emitted by said sender, said partially transparent hollow mirror reflecting a part of the light which was reflected by said mirror prism, upon said light receiving devices.

3. An electrical light screen, comprising a sender emitting a bundle of light rays, a rotary polygonal mirror prism receiving said ray bundle and transforming it into a light curtain, a parabolic cylindrical mirror limiting said screen on one side, said mirror prism transmitting light to said parabolic mirror, a mirror limiting said screen on the other side and receiving light from said parabolic mirror, the last-mentioned mirror reflecting said light back to the parabolic mirror and the parabolic mirror reflecting the last-mentioned light back to the mirror prism, a light receiving releasing device, said device being positioned to receive light reflected from said parabolic mirror upon said mirror prism, and a cylinder lens having a main axis located in the plane of said light curtain and perpendicular to the focal line of the parabolic cylindrical mirror, whereby the cylindrical mirror and the cylinder lens form an anamorphotic system.

References Cited in the file of this patent
UNITED STATES PATENTS

| | | |
|---|---|---|
| 2,086,391 | Poole | July 6, 1937 |
| 2,124,802 | Wallace | July 26, 1938 |
| 2,257,763 | Petterson | Oct. 7, 1941 |
| 2,419,459 | McDowell | Apr. 22, 1947 |
| 2,432,810 | Ryder | Dec. 16, 1947 |

OTHER REFERENCES

Book: "Photoelectricity," by Zworykin and Ramberg, 1949, pages 433–434.